July 21, 1964  L. V. CRAYCRAFT ETAL  3,141,326
SAFETY AND ARMING MONITORING DEVICE
Filed Oct. 30, 1962
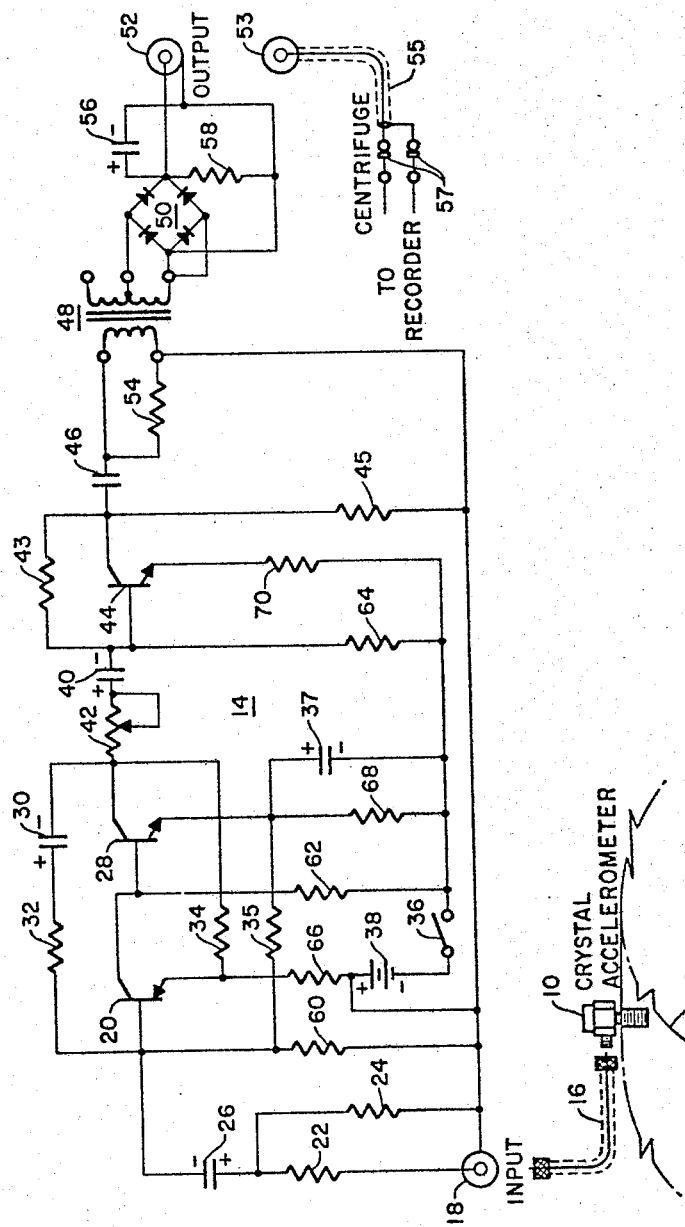
LESTER V. CRAYCRAFT
EUGENE E. BARILOTTI
*INVENTORS*
BY *T. M. Phillips*
*J. M. St. Amand*
ATTORNEYS

3,141,326
SAFETY AND ARMING MONITORING DEVICE
Lester V. Craycraft, Riverside, and Eugene E. Barilotti, Ontario, Calif., assignors to the United States of America as represented by the Secretary of the Navy
Filed Oct. 30, 1962, Ser. No. 234,263
1 Claim. (Cl. 73—71.2)
(Granted under Title 35, U.S. Code (1952), sec. 266)

The invention herein described may be manufactured and used by or for the Government of the United States of America for governmental purposes without the payment of any royalties thereon or therefor.

The present invention relates to a safety and arming monitoring device and more particularly to a safety and arming monitoring device that utilizes a crystal accelerometer for sensing the pallet clatter on the gear train, solenoid plunger bottoming and g-weight movement.

The safety-arming mechanism in the warhead of a guided missile is to prevent premature firing of the warhead by keeping the fuze firing system in safe condition during transportation and handling and to provide the fuze with proper arming sequencies during flight of the missile. Since the total flight time of a tactical guided missile is very short, in preflight tests, it is very difficult to measure accurately the proper functioning of the safety-arming mechanism. These measurements are normally made on the safety-arming device while it is attached to the arm of a centrifuge and the centrifuge is exciting between 5 and 100 g's. In the past no reliable means have been available to perform these measurements. Accordingly, an object of the present invention is to provide a simple and accurate external means of measuring the function of a safety and arming device.

Another object of the invention is to provide a means of measuring the modes of operation of a safety-arming device by sensing and analysing the gear clatter of the device.

Other objects and many of the attendant advantages of this invention will become readily appreciated as the same becomes better understood by reference to the following detailed description when considered in connection with the accompanying drawings wherein there is shown in the single figure a preferred embodiment of the invention.

By attaching a crystal accelerometer to the housing of the safety-arming device and feeding the output from the crystal through a short lead to an amplifier, it is possible to measure the commit-to-arm time (one to three seconds) with a tolerance of one percent; give an accurate indication of the launch-latch solenoid operation; measure the self-destruct time sequence (twenty to thirty seconds); and provide a means of identifying trouble if failure or faulty operation occurs in the device. The safety-arming device on which these measurements are made is of the type shown and described in U.S. patent application, Serial No. 772,152 of Voida et al., filed October 7, 1958, for Counter-Rotating Dual Rotor Safety and Arming Mechanism.

Referring now to the drawings, there is shown in the figure a crystal accelerometer 10 which is attached to the housing 12 of a safety-arming device. Safety and arming device 12 may be of the type shown and described in U.S. patent application No. 772,152 cited above. The output of accelerometer 10 is coupled to amplifier 14 by means of coaxial cable 16 and input connector 18. The signal from accelerometer 10 is connected to the base of transistor 20 through a high input network consisting of resistors 22, 24, and capacitor 26. The input stage of amplifier 14 includes transistors 20, 28, connected in tandem and a positive feedback loop including capacitor 30 and resistor 32 and a negative feedback loop including resistor 34. Power is supplied through switch 36 from a power source shown as battery 38. The output of the input stage is coupled by coupling capacitor 40 and gain-control potentiometer 42 to the base of output stage transistor 44. Resistor 43 is connected between the collector and base to provide stabilization. The output from transistor 44 which appears across load resistor 45 is coupled by capacitor 46 and transformer 48 to full wave bridge rectifier 50. Thus, a D.C. step function is provided at output terminal 52. Filtering of the signal is provided by capacitor 46, resistor 54, and capacitor 56, resistor 58 networks. Base biasing is provided by means of resistors 60, 62, and 64 while emitter biasing is provided by resistors 66, 68, 70, and capacitor 37. The output signal from terminal 52 is coupled by means of connector 53 and coaxial line 55, slips-rings 57 to a recorder (not shown) external from the centrifuge.

In use the monitoring device is mounted on a rotary accelerator along with the safety-arming device to be tested.

Crystal accelerometer 10, fastened to the case of safety-arming device 12, responds to internal vibrations caused by pallet clatter on the gear train, solenoid plunger bottoming, and g-weight movement to produce electrical signals which are amplified by amplifier 14, rectified and fed to a recorder. The following values and components have been found to operate satisfactorily:

| | |
|---|---|
| Accelerometer 10 | Columbia Model 410. |
| Transistor 20 | 2N652. |
| Transistors 28, 44 | 2N440. |
| Transformer 48 | UTCO-7. |
| Voltage source 38 | 22.5 v. D.C. |
| Rectifier bridge 50 | IN457 diodes. |
| Capacitor 26 | 1 $\mu$f. |
| Capacitor 30 | 3.9 $\mu$f. |
| Capacitor 37 | 8 $\mu$f. |
| Capacitor 40 | 2 $\mu$f. |
| Capacitor 46 | 0.003 $\mu$f. |
| Capacitor 56 | 0.047 $\mu$f. |
| Resistor 22 | 500K ohms |
| Resistor 24 | 200K ohms. |
| Resistor 32 | 150K ohms. |
| Resistor 34 | 3.9K ohms. |
| Resistor 35 | 300K ohms. |
| Resistor 42 | 50K ohms. |
| Resistor 43 | 56K ohms. |
| Resistor 45 | 12K ohms. |
| Resistor 54 | 33K ohms. |
| Resistor 58 | 110K ohms. |
| Resistor 60 | 47K ohms. |
| Resistor 62 | 10K ohms. |
| Resistor 64, 68 | 27K ohms. |
| Resistor 66 | 1K ohm. |
| Resistor 70 | 200K ohms. |

Full wave bridge rectifier 50 rectifies the A.C. output from amplifier 14 and gives a D.C. step function which can be recorded on a slow-speed pen recorder (not shown) as well as a high-speed oscillograph recorder (not shown). The sharpness of the trace is controlled by varying the resistor 58-capacitor 56 filter combination.

Obviously many modifications and variations of the present invention are possible in the light of the above teachings. It is therefore to be understood that within the scope of the appended claim the invention may be practiced otherwise than as specifically described.

What is claimed is:

A safety-arming monitoring device for providing an external means of sensing the modes of operation of a safety-arming device that is subjected to 5 to 100 g's during testing comprising:

(a) a safety-arming device mounted on the arm of a centrifuge whereby internal vibrations are produced by the pallet clatter on the gear train, solenoid plunger bottoming, and g-weight movement in response to the acceleration of the centrifuge arm, (b) a crystal accelerometer mounted on said safety-arming device and being responsive to said internal vibrations for producing an output signal, (c) an amplifier comprising:
  (1) a first transistor having a base coupled to the output of said crystal, an emitter connected to a power source and a collector,
  (2) a second transistor having a base connected to the collector of said first transistor, an emitter connected to said power source and a collector,
  (3) a series connected resistor-capacitor feedback circuit connected between the collector of said second transistor and the base of said first transistor,
  (4) a resistor feedback circuit connected between the collector of said second transistor and the emitter of said first transistor,
  (5) a third transistor having a base, an emitter connected to said power source and a collector,
  (6) a series circuit consisting of a variable resistor and a capacitor connected between the collector of said second transistor and the base of said third transistor,
  (7) a resistor connected between the collector and the base of said third transistor and,
  (8) output transformer circuit means capacitor coupled to the collector of said third transistor.

(d) full-wave bridge rectifier circuit means coupled to said output transformer circuit means for providing a D.C. step function capable of being recorded on a slow-speed pen recorder, and (e) slip-rings coupling means coupling the output of said transformer circuit means to a utilization circuit means.

References Cited in the file of this patent

UNITED STATES PATENTS

| | | |
|---|---|---|
| 2,650,991 | Ketchledge | Sept. 1, 1953 |
| 2,889,519 | Montgomery et al. | June 2, 1959 |

FOREIGN PATENTS

| | | |
|---|---|---|
| 840,666 | Great Britain | July 6, 1960 |

OTHER REFERENCES

Macpherson, J. D.: "Low Noise Hydrophone Preamplifier;" The Review of Scientific Instruments, vol 30; No. 7, July 1959; pages 533, 534 and 535.